United States Patent
Rudin et al.

(10) Patent No.: US 8,014,588 B2
(45) Date of Patent: Sep. 6, 2011

(54) SYSTEM AND METHOD FOR THREE-DIMENSIONAL ESTIMATION BASED ON IMAGE DATA

(75) Inventors: Leonid I. Rudin, San Marino, CA (US); Jean-Michel Morel, Paris (FR); Pascal Monasse, Los Angeles, CA (US); Frédéric Cao, Boulogne (FR)

(73) Assignee: Cognitech, Inc., Pasadena, CA (US)

( * ) Notice: Subject to any disclaimer, the term of this patent is extended or adjusted under 35 U.S.C. 154(b) by 1325 days.

(21) Appl. No.: 11/594,554

(22) Filed: Nov. 6, 2006

(65) Prior Publication Data

US 2007/0242872 A1    Oct. 18, 2007

Related U.S. Application Data

(60) Provisional application No. 60/733,734, filed on Nov. 4, 2005.

(51) Int. Cl.
*G06K 9/00* (2006.01)

(52) U.S. Cl. .......................................................... 382/154

(58) Field of Classification Search .................... 382/154
See application file for complete search history.

(56) References Cited

U.S. PATENT DOCUMENTS

| | | | |
|---|---|---|---|
| 5,710,875 | A | 1/1998 | Harashima et al. |
| 5,937,105 | A | 8/1999 | Katayama et al. |
| 6,263,100 | B1 | 7/2001 | Oshino et al. |
| 6,608,622 | B1 | 8/2003 | Katayama et al. |
| 6,628,820 | B2 | 9/2003 | Oshino et al. |
| 6,633,664 | B1 | 10/2003 | Minamida et al. |

FOREIGN PATENT DOCUMENTS

| | | |
|---|---|---|
| JP | 11 183139 | 7/1999 |
| JP | 11 339043 | 12/1999 |

OTHER PUBLICATIONS

Baker, H., "Surface Reconstruction From Image Sequences", International Journal of Computer Vision, 1988 (pp. 334-343).*

Baker, et al., "Generalizing Epipolar-Plane Image Analysis on the Spatiotemporal Surface", International Journal of Computer Vision, vol. 3, No. 1, 1989 (cover pp. 2; pp. 33-49).

(Continued)

*Primary Examiner* — Samir A Ahmed
*Assistant Examiner* — Fred Hu
(74) *Attorney, Agent, or Firm* — Klein, O'Neill & Singh, LLP

(57) ABSTRACT

A method and apparatus to extract a dense three-dimensional model of an observed scene or object from one or more sequences of images acquired with an imaging device such as a camera or camcorder, or clusters of cameras and/or camcorders. In some embodiments the method includes capturing an image sequence by a camera moving with a translateral motion, for example moving on a straight path with a fixed orientation. The images in each sequence are captured at regularly spaced sites on the straight path. In some embodiments, a device projects structured light on the observed scene. Multiple image sequences can be acquired, on different cameras on straight paths. The captured image sequences are input to a computer. The 3D structure of the scene viewed by each image sequence is computed. Dense reconstruction from EPIs is performed by interpolating the EPIs after having detecting straight segments on the EPIs. 3D models extracted from each image sequence are combined and merged to create a 3D model of the whole scene.

20 Claims, 10 Drawing Sheets

OTHER PUBLICATIONS

Bolles, et al., "Epipolar-Plane Image Analysis: An Approach to Determining Structure from Motion*", International Journal of Computer Vision, vol. 1, No. 1, 1987 (pp. 7-55).

Criminisi, et al., "Extracting Layers and Analyzing Their Specular Properties Using Epipolar-Plane-Image Analysis", Computer Vision and Image Understanding 97, 2005 (pp. 51-85).

Musé, P., On the definition and recognition of planar shapes in digital images (2004), (Ph.D. thesis, L'École Normale Supérieure de Cachan), (335 pages).

Galvin, et al., "On the Creation of Dense Depth Fields From Long Image Sequences", Proceedings of Digital Image Computing: Techniques and Applications, 1997(6 pages).

Gotoh, et al., "Geometry Reconstruction of Urban Scenes by Tracking Vertical Edges", IEEE Computer Society Third International Conference on Knowledge-Based Intelligent Information Engineering Systems, 1999 (pp. 455-458).

Zhu, et al., "Panoramic EPI Generation and Analysis of Video From a Moving Platform With Vibration", IEEE Computer Society Conference on Computer Vision and Pattern Recognition, 1999 (pp. 531-537).

Dementhon, D., "Spatio-Temporal Segmentation of Video by Hierarchical Mean Shift Analysis", Statistical Methods in Video Processing Workshop, Image and Vision Computer, 2002 (6 pages).

Feldmann, et al., "Image Cube Trajectory Analysis for Concentric Mosaics", International Conference on Image Processing, 2003 (cover pp. 2, pp. 343-350).

Feldmann, et al., "Extension of Epipolar Image Analysis to Circular Camera Movements", IEEE Computer Society International Conference on Image Processing, 2003 (pp. 697-700).

Apostoloff, et al. "Learning Spatiotemporal T-Junctions for Occlusion Detection", IEEE Computer Society Conference on Computer Vision and Pattern Recognition, 2005 (7 pages).

Criminisi, et al. "Extracting Layers and Analyzing Their Specular Properties Using Epipolar-Plane-Image Analysis", Computer Vision and Image Understanding 97, 2005 (pp. 51-85).

Li, et al. "Efficient Dense Depth Estimation From Dense Multiperspective Panoramas", IEEE Computer Society International Conference on Computer Vision, 2001 (pp. 119-126).

Mellor, et al., "Dense Depth Maps from Epipolar Images", Massachusetts Institute of Technology: Artificial Intelligence Laboratory, 1996 (cover p. 1, pp. 1-12).

Zhu, et al., "Constructing 3D Natural Scene From Video Sequences With Vibrated Motions", IEEE Computer Society Virtual Reality Annual International Symposium, 1998 (8 pages).

Baker, H. H. (1988). Building, visualizing, and computing on surfaces of evolution. IEEE Computer Graphics and Application, 8(4):31-41.

* cited by examiner

SYSTEM AND METHOD FOR THREE-DIMENSIONAL ESTIMATION BASED ON IMAGE DATA

CROSS-REFERENCE TO RELATED APPLICATION(S)

This application claims the benefit of U.S. Provisional Application, Ser. No. 60/733,734, filed Nov. 4, 2005, the contents of which are hereby incorporated by reference in their entirety.

BACKGROUND OF THE INVENTION

The invention relates generally to image analysis, and more particularly to generating a three dimensional model based on two dimensional images.

Three dimensional models, and information provided by three dimensional models, are often very useful. Obtaining a three dimensional model, or information making up a three dimensional model, may be difficult, however. For example, a variety of data capture devices exist for capturing data in two dimensions, and many of these devices can capture copious amounts of information. Extracting three dimensional information from the data, however, may be difficult, particularly in an automated fashion.

One difficulty in recovering three-dimensional structure from a set of images of a scene is in solving the correspondence problem: given a point in one image, finding the point in another image that corresponds to the same 3D point in the observed scene. One method to bypass the correspondence problem is to move a camera over time on a straight path with fixed orientation, such that the optical axis of the camera is perpendicular to the motion direction, and capturing images at regularly spaced sites, $I_1, \ldots, I_N$. If x denotes the direction of the motion and y the orthogonal direction in the camera focal plane, a spatio-temporal manifold, for example, a spatio-temporal volume can then be built by stacking images $I_1$ to $I_N$ in the direction orthogonal to the image plane. Under this motion and image acquisition conditions discussed above, the x-t slices (i.e. y=constant), which in this instance may be termed Epipolar-Plane Images (EPIs), are formed of homogeneous regions with straight segment boundaries. These straight lines correspond to the trajectories of points lying on the epipolar plane, and the depth of these points is inversely proportional to the slope of the corresponding straight segment. The proportionality constant depends on the internal calibration parameters and the external calibration parameters, for example, the camera resolution, the camera angle and the distance between two consecutive camera positions (acquisition sites).

This reduces the correspondence problem to a problem of straight line detection. Notice that each slice can be processed independently and consequently they can be treated in parallel.

An inherent difficulty with EPI analysis is that the depth of those features that do not have a component perpendicular to the motion direction cannot be estimated. In addition, complying with camera motion and acquisition restrictions may be difficult.

In addition, segment detection (in the case of uniform linear camera motion) does not lead to a dense three-dimensional reconstruction. Indeed, EPIs are often formed of almost homogeneous regions bounded by straight segments; these straight segments correspond generally to trajectories of 3D points located in the boundaries of the 3D objects in the observed scene. This means that, at most, only objects boundaries may be reconstructed.

BRIEF SUMMARY OF THE INVENTION

In one aspect the invention provides a method of determining three dimensional information from two dimensional images of a scene, comprising forming a spatio-temporal volume from two dimensional images of a scene; determining characteristics of the spatio-temporal volume; decomposing the spatio-temporal volume into cells using the characteristics of the spatio-temporal volume; and densifying the decomposed spatio-temporal volume.

In another aspect the invention provides a system for forming three dimensional information from two dimensional images of a scene, comprising a camera on a stage; a motor for moving the camera; a computer configured to provide commands to the motor and to provide commands to the camera, and to receive image information from the camera; the computer being programmed to form a spatio-temporal volume from the image information, determine characteristics of the spatio-temporal volume, decompose the spatio-temporal volume into cells using the characteristics of the spatio-temporal volume, and densify the decomposed spatio-temporal volume.

In another aspect the invention provides a system comprising a camera; means for translating the camera in a first direction; and means for determining a spatio-temporal volume from images received from the camera, for determining meaningful characteristics of the spatio-temporal volume, and for densifying the spatio-temporal volume.

These and other aspects are more fully comprehended upon review of this disclosure.

DETAILED DESCRIPTION OF THE INVENTION

Figure 1:
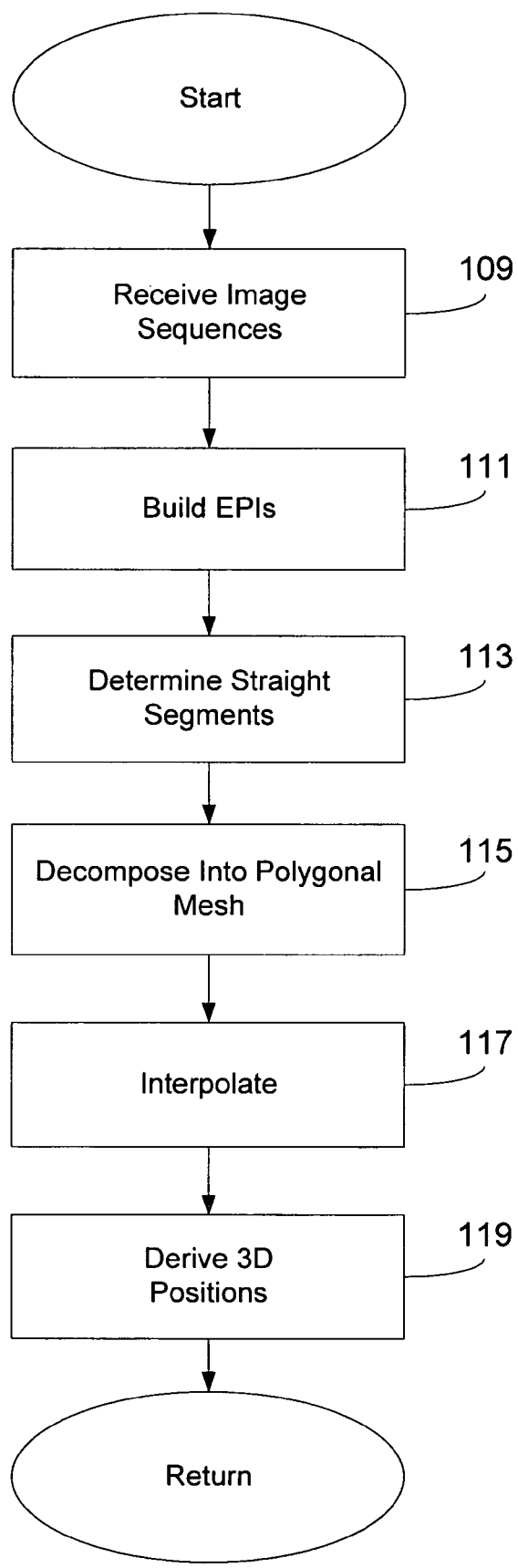
FIG. 1 is a flow diagram of a process for determining three dimensional information from two dimensional information in accordance with aspects of the invention.

A flow diagram of a process in accordance with aspects of the invention is shown in FIG. 1. In block 109 the process receives a set of images. Preferably the set of images form one or more image sequences, with preferably each image in each sequence captured at regularly spaced sites on a straight path. In some embodiments the images are captured by an image acquisition device as discussed further below.

Figure 2:
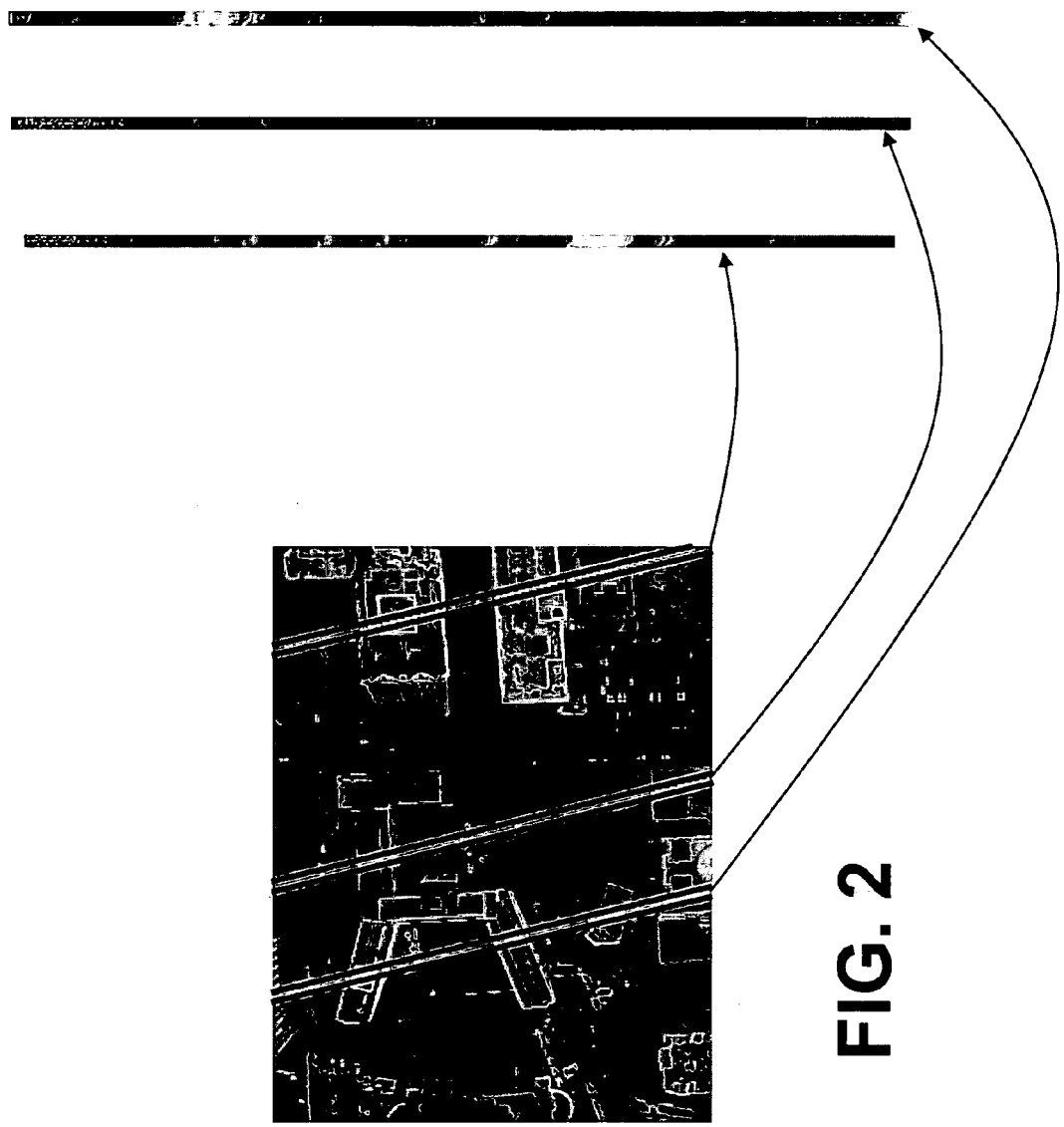
FIG. 2 is an image of a scene.

FIG. 2 illustrates an image of a scene. The image is taken from an altitude above the scene, with the scene including a number of structures, including tall buildings, streets, and other features present on an urban landscape. Three lines are superimposed on the image, with each line bounded by dark lines for illustrative purposes. Generally an acquisition device, such as a camera, is transported along a line, with the camera acquiring images, preferably evenly spaced, along the line. For the example shown in FIG. 2, the camera may be transported by an aircraft along the line at a constant velocity, with the camera acquiring images at a constant rate. Preferably the images are also acquired at a constant altitude, such that the lines are epipolar lines.

Returning to FIG. 1, in block 111 the process builds spatio-temporal manifolds. Preferably the spatio-temporal manifolds are spatio-temporal volumes, and preferably, the spatio-temporal volumes are EPIs. It should be noted, however, that the spatio-temporal manifolds need not be generated from images taken at different times. Instead, the nomenclature is used in that in most instances image acquisition is performed by moving camera position over time. Assuming a camera angle with the x direction to be zero, the lines, preferably epipolar lines, correspond to image rows. If the x direction is not zero, a corresponding rotation can be applied to the image sequence to make the lines correspond to image rows. Hence, this mechanical constraint can be relaxed if the lines direction can be estimated. This can be done by applying a stereo calibration procedure, either manually (by using a calibration rig) or in a more automatic way by finding a few correspondences between images using corners or image patches. In many embodiments it is sufficient to perform stereo calibration up to a scale in order to estimate rotation.

To each line, a spatio-temporal manifold is associated. For each image row (after any appropriate rotation correction), a spatio-temporal manifold is built by stacking its evolution in time. If the focal axis of the camera is orthogonal to the motion direction, and referring to EPIs generally throughout for simplicity of discussion, physical 3D points are imaged in EPIs as propagating in straight lines. If the angle with the z direction is non-zero, these trajectories are not straight lines but hyperbolas, which are generally harder to detect than straight lines. Fortunately, a rotation estimation and correction technique based on stereo calibration, for example such as discussed above, can be applied to the image sequences. Building EPIs once this correction is made leads to straight space-time trajectories.

Figure 3:
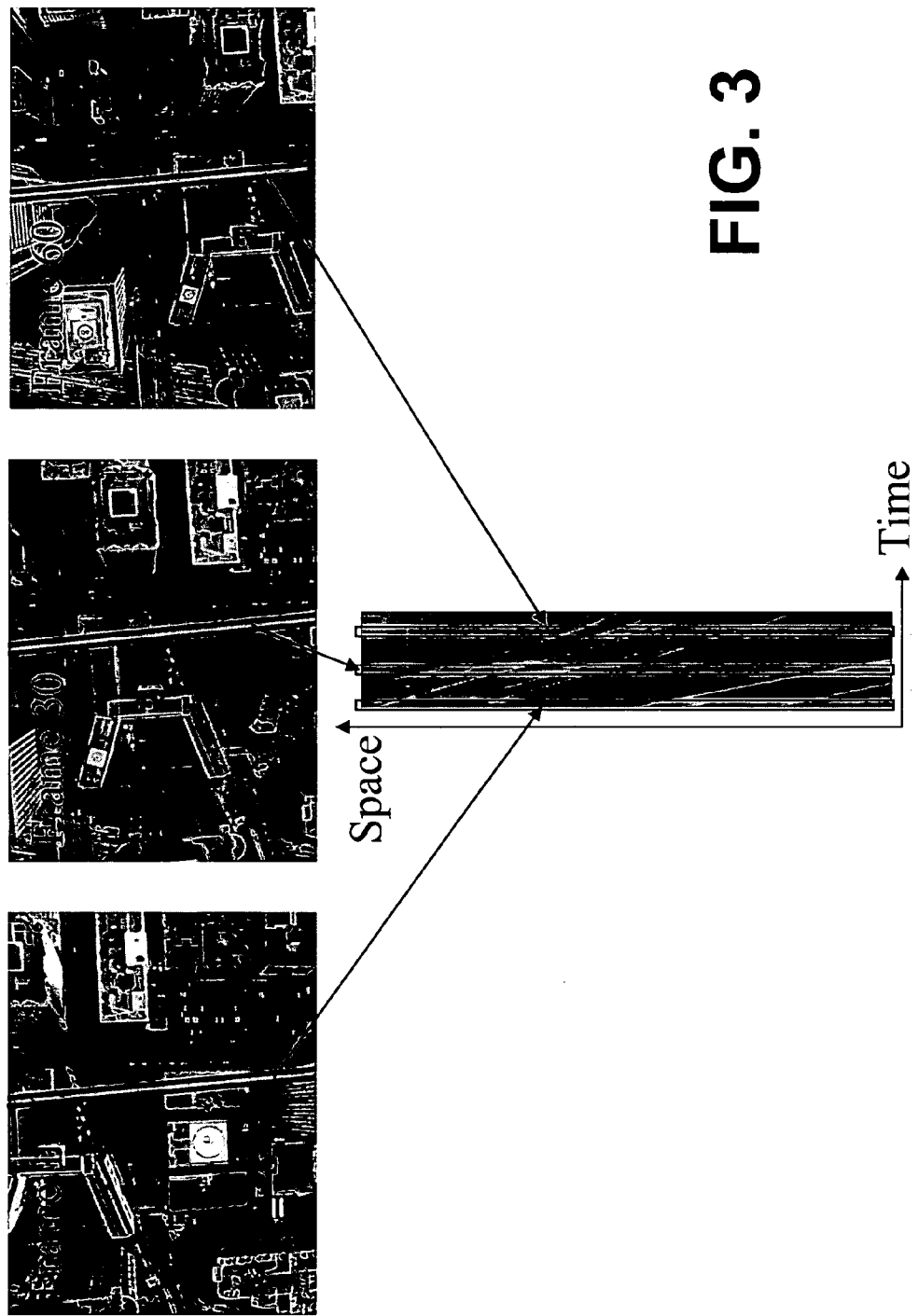
FIG. 3 shows an example of an epipolar plane image and sample images used in generating the epipolar plane image.

FIG. 3 shows an example of an EPI along with samples of images used to generate the EPI. FIG. 3 includes three images of a scene generally corresponding to the scene of FIG. 2. Each of the three images are taken along an epipolar line, bounded by dark lines in FIG. 3, although each image is taken at a different position along the epipolar line. For example, the first image may correspond to a first image or frame taken along the epipolar line, the second image may correspond to a 30th frame, and the third image may correspond to a 60th frame. The EPI includes epipolar line portions of a plurality of images such as the three images taken along the epipolar line, with each subsequent epipolar line portion placed adjacent a prior epipolar line portion. Thus, and as shown in FIG. 3, the epipolar portion of the first image is shown at the far left of the EPI, the epipolar portion of the second image is shown somewhat to the right of the epipolar portion of the first image, and the epipolar portion of the third image is shown somewhat to the right of the epipolar portion of the second image.

Returning again to FIG. 1, in block 113 the process performs segment extraction from EPIs. In most embodiments segment extraction comprises straight segment extraction, and, in most embodiments, straight segment extraction from EPIs includes detection of small straight digital segments (chain codes), chain code relaxation, and straight segments simplification and filtering. In some embodiments, averaging is performed on extracted segments over multiple manifolds. For example, in some embodiments, windows of u-v positions in multiple manifolds are examined, and segments having similar slopes within corresponding windows are averaged.

In block 115 the process performs extension of straight segments, detection of T-junctions and decomposition of EPIs. In most embodiments decomposition of EPIs comprises partitioning EPIs into cells, for example decomposition into polygonal meshes or tessellation of EPIs. Generally, an EPI can be decomposed as a polygonal mesh. In many embodiments polygons of the polygonal mesh are convex. The decomposition of an EPI, for example into a polygonal mesh, simplifies interpolation, since the problem is transformed into an interpolation problem inside cells, or each polygon for a polygonal mesh. In addition, in most embodiments the straight segments detected in the previous stage are extended from both endpoints, until they meet other straight segments with a greater slope. Generally, a segment with higher slope corresponds to a point which is seen from the camera as moving faster, which means that this point is closer to the camera and will occlude points farther than the camera.

In block 117 the process performs interpolation on the EPIs. In various embodiments this is zero or first order interpolation, or interpolation based on dynamic programming. It may be based on gray level or on color information.

In block 119 the process derives the 3D position of every point represented in the EPIs using the results of the interpolation stage and, for example, calibration information. Further, in some embodiments, point positions, or merely point heights, are averaged over point positions from adjacent manifolds. In various embodiments, the averaging is a weighted averaging or some other averaging or statistical technique. In many embodiments, such averaging is only performed over windows of pixels having similar color values, or over windows of similar pixels, or an averaging weight is based on similarity of pixels within a window. In addition, if a cluster of cameras is used, from each camera a 3D model of the observed scene may be computed. In this step, these 3D models are registered. Coarse registration is possible since the relative positions between the cameras in the cluster is known. Fine registration is preferably based on Iterative Closest Point (ICP)-like techniques.

In addition, in some embodiments three-dimensional registration of linear scans is performed, assuming more than one linear scan. Coarse registration is possible since the rotation angle of the linear stage is known, or a small set of candidates is known. If two scans taken by moving the linear stage position by an unknown displacement, coarse registration should be guided by the user, by interactively registrating both 3D models. Fine registration is preferably based on Iterative Closest Point (ICP)-like techniques.

Figure 4:
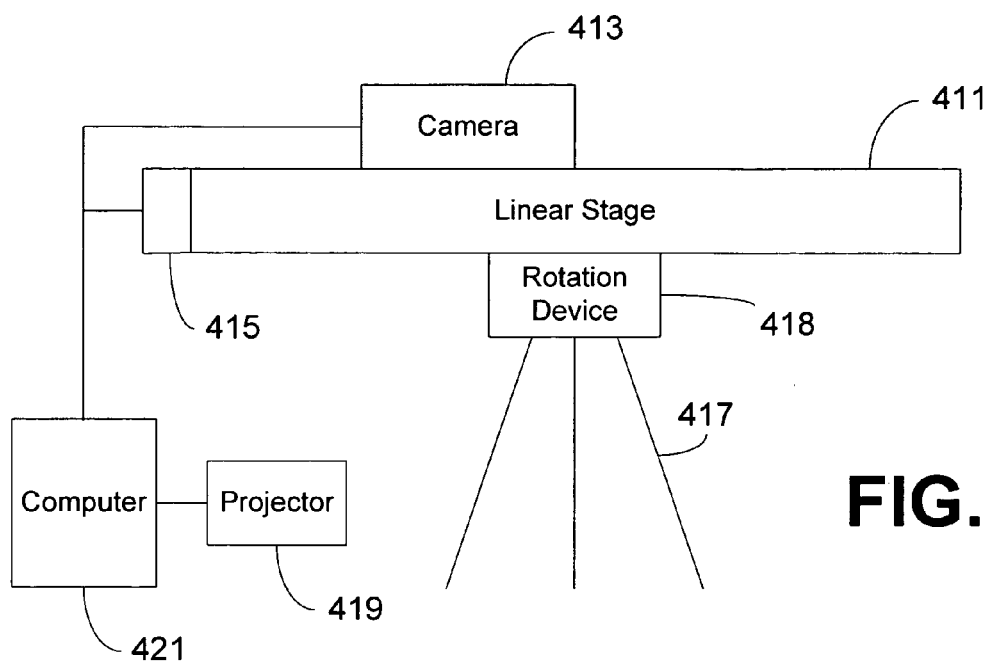
FIG. 4 is a block diagram of an image acquisition and processing system in accordance with aspects of the invention.

In some embodiments image acquisition is performed using a camera transported by an aircraft, a vehicle, or other transport device. In some embodiments an image acquisition system such as the system of FIG. 4 is used. FIG. 4 is a block diagram of an integrated image acquisition and processing system. The system comprises a linear stage 411, which in many embodiments is up to one meter long, and a camera 413 that slides on the linear stage. Operation of a motor 415 controls the motion and position of the camera on the stage, preferably with at least millimetric precision for a linear stage less than approximately one meter. The linear stage may sit on a tripod 417 including a rotatable mount or device 418, preferably allowing rotation of the linear stage by any angle. The acquisition device may also include a projector 419 that can project structured light on the scene. A computer 421 provides control signals for the motor, the camera, and optionally the rotation device and projector, as well as receiving and storing images from the camera in some embodiments. In some embodiments the computer additionally performs a process, such as the process of FIG. 1, to determine three dimensional information, or sub-processes thereof.

Figure 5:
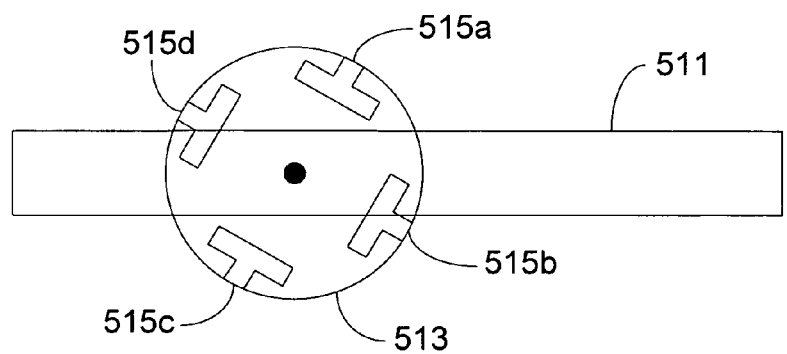
FIG. 5 is a block diagram of a portion of a further system in accordance with aspects of the invention, the further system including a plurality of cameras.

The camera may in fact comprise clusters of cameras, one possibility being two cameras with focal axis pointing at opposite directions, or four cameras arranged as shown in FIG. 5. FIG. 5 shows a linear stage 511 with a rotatable camera mount 513 translatable along the linear stage. Four cameras 515 a-d are positioned on the rotatable camera mount.

It can be considered that x denotes the direction of the motion, y its orthogonal direction on the camera focal plane, and z the direction orthogonal to x and y. Ideally, if a single camera or a pair of cameras pointing in opposite direction is used, their focal axes should be collinear with z, but slight non-collinearity is tolerated and can be precisely corrected afterward. The same correction technique allows use of clusters of cameras (their focal axes will generally not be orthogonal to the motion direction).

In operation, the motion of the camera on the stage is controlled by operation of the motor in such a way that speed is constant (in case the image sequence is recorded with a camcorder), or that images are captured at regularly spaced intervals δx, generally on the order of 1 centimeter, with a precision of 1 millimeter. A sequence of images is captured while the camera position spans the linear stage. Each of these sequences may be referred to as a linear scan.

Several linear scans $S_{\theta_1}, \ldots, S_{\theta_n}$ can be acquired, for example, by applying a planar rotation of the linear stage about a fixed point, with angles $\theta_1, \ldots \theta_n$. These angles preferably are known, but high precision is not required. Another possible configuration is that those angles are not known, but they are known to belong to a pre-defined set of angles fixed by the rotation device. A typical configuration could be an horizontal linear scan followed by a vertical linear scan.

Optionally, structured light may be projected on the scene, in order to enable recovery of 3D coordinates of points inside a uniform object (homogeneous color and no texture, like a white wall for example). As previously mentioned EPI analysis generally does not provide depth estimates for observed features (object boundaries, for instance) that do not have a component perpendicular to the motion direction. An extreme case is an object having uniform color and no texture; for those objects, EPI analysis generally only provides for 3D reconstruction of the object's boundaries. Using structured light provides a way to overcome this difficulty. The projected structured light preferably has components orthogonal to the camera motion direction. For example, the 3D structure of a uniform white object can be recovered with EPI analysis, if the acquisition is performed with horizontal camera motion and projection of a pattern made by vertical lines. In some embodiments a motor controlled linear stage, a camera or cluster of cameras and optionally a projector, are combined with the 3D structure computation method described with respect to FIG. 1.

In some embodiments the images are of a space, which may be a landscape or an enclosed or partially enclosed space, such as a courtyard, an entry way, an auditorium or a room of a house or building. The images may be acquired, for example, using a device such as the device of FIG. 4 or 5, or as otherwise described, and the image information may be processed by a process, such as the process of FIG. 1, to derive three dimensional information of the space. The three dimensional information may be used in a variety of ways. For example planners, architects, designers, and others may use the three dimensional information for considering placement and movement of items, such as landscape or furniture for example, within the space. As another example, the three dimensional information may be used to determine whether, for example, an area contains sufficient space for helicopter landings, particularly within urban areas, or to determine a variety of other items of information as to potential uses of a space.

Figure 6:
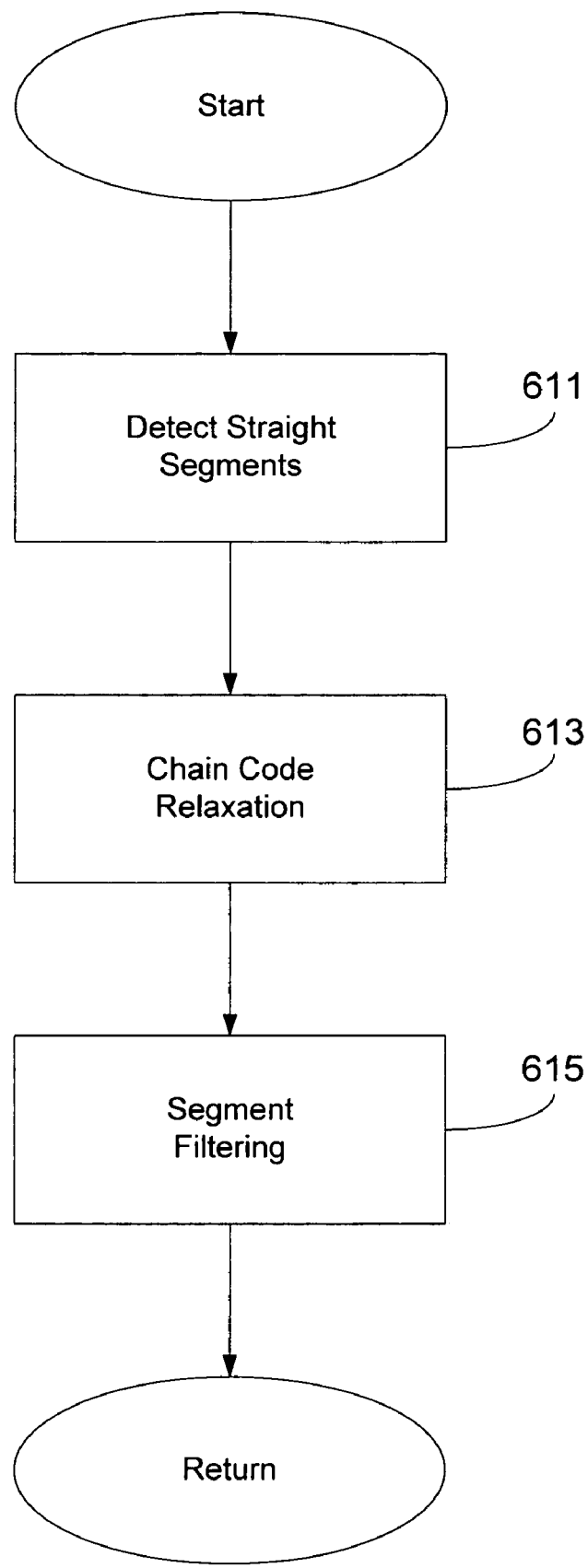
FIG. 6 is a flow diagram of a process to extract digital segments in accordance with aspects of the invention.

FIG. 6 is a flow diagram of a process to extract digital straight segments along level lines. The process of FIG. 6 may be used, for example, to perform a segment extraction of block 113 of the process of FIG. 1. An advantage of using digital segments is that doing so takes into account the pixelization, the discrete model of the straight segment, and that no approximation or interpolation is involved. In many embodiments the level lines are not first extracted, which would slow the overall process. Instead, level lines are followed as long as they could correspond to the pixelization of continuous straight segment. In some embodiments, however, level lines are extracted, which slows the overall process.

In one embodiment pixels are considered squares of constant gray value. Level lines are composed of connected edgels (edge elements), horizontal or vertical segments of length 1 adjacent to two neighbor pixels. If two neighbor pixels have different gray values, the edgel between them belongs to one or more level lines.

In block 611 the process detects straight segments. Several methods are known for detecting straight segments formed of digital information. In one embodiment the process locates a pair of neighboring pixels with different gray levels. The process extracts all straight segments on level lines containing the edgel between both pixels. The location and extraction is performed for all edgels between pixels having different gray levels. In some embodiments the process also requires a minimum contrast in order to reduce the number of detected segments.

In some embodiments the process follows edgels according to an orientation: horizontal edgels can be oriented to the left (L) or the right (R), while vertical edgels can be oriented to the top (T) or to the bottom (B). The orientation of the start edgel may be arbitrarily determined, but thereafter all parallel edgels in the straight segment will have the same orientation. That is, if one edgel is left, L, (or alternatively R), none is right, R (or alternatively L), and if one is top, T (or alternatively B), none is bottom, B (or alternatively T) in the digital straight segment. The segment can therefore be encoded with a binary code in the order they are traversed: 0 means horizontal edgel and 1 means vertical edgel, with all horizontal edgels having the same orientation and all vertical edgels having the same orientation also. This may be referred to as the chain code of the segment.

Not any sequence of 0 and 1 is necessarily a code for a straight segment. Accordingly, in some embodiments the chain codes of the segment are compared to valid chain codes.

In some embodiments two simple constraints are used to generate valid chain codes for use in the comparison. The two simple constraints may be:

1. If two 0 (or alternatively 1) are adjacent, then two 1 (or alternatively 0) cannot be adjacent. In the first case, there are more 0's than 1's, and the segment is mainly horizontal. In the second case, there are more 1's than 0's and the segment is mainly vertical.

2. If the segment is mainly horizontal (or alternatively vertical), count the number n of adjacent 0's (or alternatively 1's) between two successive 1's (or alternatively 0's). Then all maximal sequences of adjacent 0's (or alternatively 1's) have length either n or n−1, or all have length either n or n+1. This holds except for the starting and final sequences of 0's (or alternatively 1's), which can be the truncation of such a sequence.

Alternatively, use of various algorithms, such as the Brons algorithm, may be used. For example, the following may be used to determine valid chain codes:

1. Start from the sequence 0 (for example representing a horizontal line of length 1).

2. Apply the following transformation rules to already computed sequences and add the two generated sequences to the list:

a. Replace all occurrences of 0 by 01 and leave the 1's unchanged.

b. Replace all occurrences of 1 by 01 and leave the 0's unchanged.

3. Iterate step 2 until all sequences of length less than L have been processed with the above rules, and add the sequence 1 to the list (for example representing a vertical line of length 1).

For example, the only sequence of length 2 is 01 (applying the first rule to the sequence 0), which yields the two sequences of length 3, 001 and 011, and so on. In various embodiments, of course, the valid chain codes may be generated during a preprocessing step or prior to other processing.

From the pool of sequences, in some embodiments the process generates the admissible chain codes by encoding them in a binary tree. The nodes of this binary tree are interpreted in the following manner: the path from the root to the node takes at each node either the left or right child. Append a 0 to the chain code if it is the left child, and a 1 if it is the right child. All chain codes of length L must then be at depth L under the root.

The tree may be built as follows:

1. Create a root for the tree.

2. Take a sequence from the pool constructed as described above. If its length is less than L, append the sequence to itself until the length is at least L. Note the sequence $a_1, a_2, \ldots, a_L, \ldots$. Start from any position i in the sequence, and generate the code $a_{1+i}, a_{2+i} \ldots a_{L+i}$. Indices should be understood as modulo L. Build the nodes in the tree corresponding to this sequence. This should be done for every possible start position i.

3. Iterate to step 2 until all sequences are treated.

The leaves of the resulting tree are all at depth L under the root and encode the chain codes of digital straight segments of length at most L. The number of leaves is upper bounded by $2^L$, so the number of nodes in the tree would be $2^{L+1}-1$. Fortunately, the number of admissible codes is much lower. It is believed that the number of codes of digital straight segments of length L may be of the order $O(L^2)$.

Comparing the chain code of the segment may start from a horizontal edgel or a vertical edgel. This corresponds to a code beginning by 0 or 1, respectively. Set as current node the left child of the root in case it is 0 (horizontal edgel) and the right child of the root in case it is 1 (vertical edgel). Orient this edgel to the right if it is horizontal and to the bottom if it is vertical. Note the gray value a of the pixel at left of the edgel and the grey value b of the pixel at the right of the edgel. To go to the next edgel, consider each of them. Note c and d the values of pixels at the left and right. If a>b, replace the interval [a,b] by [min(a,c),max(b,d)] and by [min(b,d),max(a,c)] if a<b. Check that this interval is of width at least 1 (or some preset minimal contrast), and go to left child of current node if the new edgel is horizontal, and to right child if the new edgel is vertical. This stops when one of the two conditions happens: the current node has no child in the given direction, or the interval of gray level is not of sufficient width. At each step, at most two directions are possible, so the process can fork in two level lines. When the recursion stops, a digital straight segment of length at most L is determined. In most embodiments the digital segment is discarded if the length is smaller than a predefined value.

In block 613 the process performs chain code relaxation. Because of noise and slight grey level variations, detecting only strict digitized segments may yield an inordinate number of misdetections. Hence, a threshold $1_{min}$ is set, and the digitized level lines are only required to be digitized segments on any subpart with length larger than $1_{min}$. However, this property is local and can yield some errors. For instance, if one object is occluded by another one at a close depth, then the level line may switch from one object to the other. Hence in many embodiments a global property is also used: a piece of the level line must stay close enough to its chord (the continuous segment joining the end points). In practice, close enough often means 2 pixels.

In block 615 the process performs straight segments filtering and redundancy elimination. The detected straight segments in EPIs are often concentrated along edges because images are usually blurry. These segments are very redundant and may yield many junctions. These junctions will also be numerically unstable since these straight segments are generally parallel. A greedy algorithm based on a meaningfulness criterion eliminates most of these lines while keeping the most meaningful.

Figure 7:
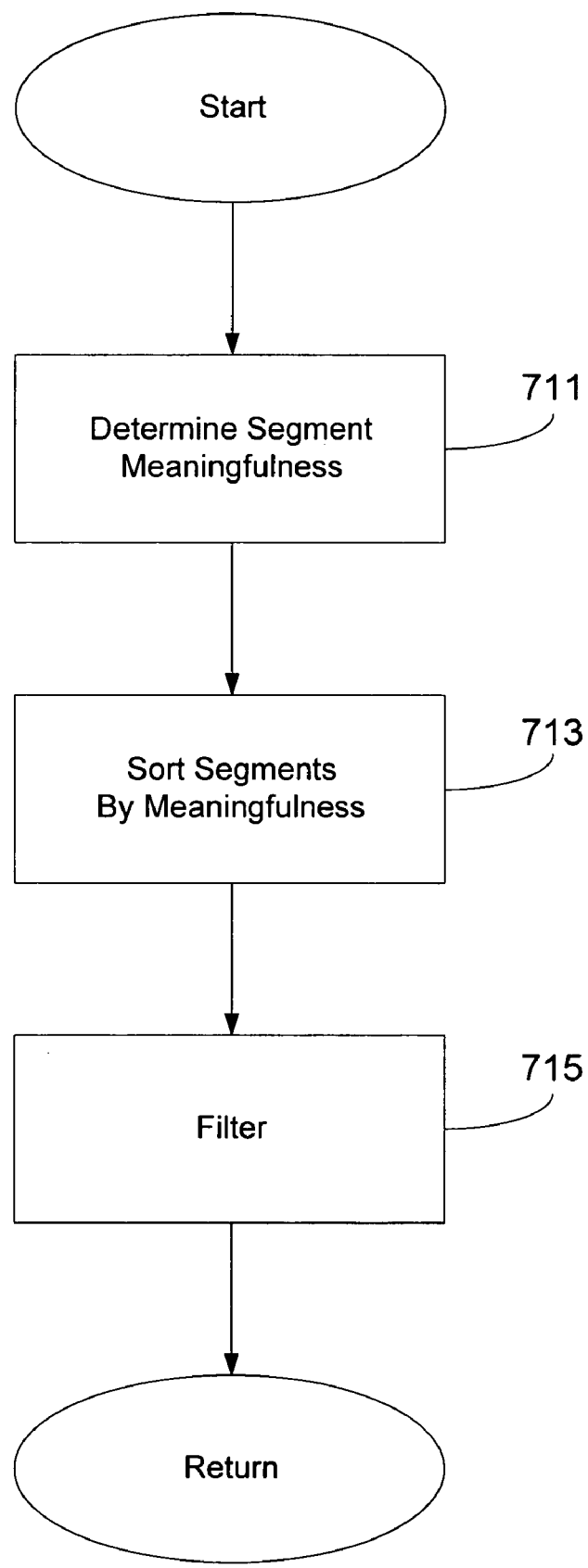
FIG. 7 is a flow diagram of a process for performing segment filtering in accordance with aspects of the invention.

FIG. 7 is a flow diagram of a process for performing straight segment filtering. In block 711 the process determines segment meaningfulness. The meaningfulness of a segment is higher when the contrast along the segment is large. More precisely, for $\mu \geq 0$, let H ($\mu$) be the empirical probability that the contrast is larger than $\mu$. The contrast is measured on each digital edgel as the absolute difference of gray level on each side of the edgel. Given a digital segment S containing n edgels, let $\mu$ be the median value of the contrast along S. The meaningfulness of S is the probability that the median value on a segment of the same length is larger than $\mu$, when the contrast assumes independent and identically distributed values at each point. This probability is given by the half tail of the binomial law $$Pr(\mu) = \sum_{n/2}^{n} \binom{n}{k} H(\mu)^k (1 - H(\mu))^{n-k}$$

In block 713 the process sorts the segments by increasing probability (decreasing meaningfulness). In block 715 the process filters the segments. In one embodiment the process initializes by setting all digital edgels as unmarked. The process then processes each segment S in order from the ordered list. For each segment the process removes all edgels that have already been marked, resulting in smaller sub-segments, and marks the remaining edgels as belonging to S. The largest remaining sub-segment of S is then stored as a segment, and the next segment is processed.

Decomposition into a polygonal mesh includes, in some embodiments, detection of junctions and extension of straight segments. In principle, a straight segment in an EPI should start at a disocclusion and end at an occlusion. A junction is simply the intersection of two straight segments. Since higher slope segments, which may be considered faster segments, correspond to points that are close to the camera, they should always occlude segments of smaller slope, which may be considered slower segments, which correspond to farther points. Preferably, each segment should be extended as much as possible and be only cut at both ends by a straight segment of higher slope.

An embodiment of the process is as follows. Each characteristic may be described by two segments, a detected digital segment and a continuous segment. The detected digital segment may be termed a segment seed, and may be the segment identified by the process of FIG. 7. The continuous segment is a segment bounded by the EPI containing the endpoints of the detected digital segment, and may be termed an extension.

Figure 8:
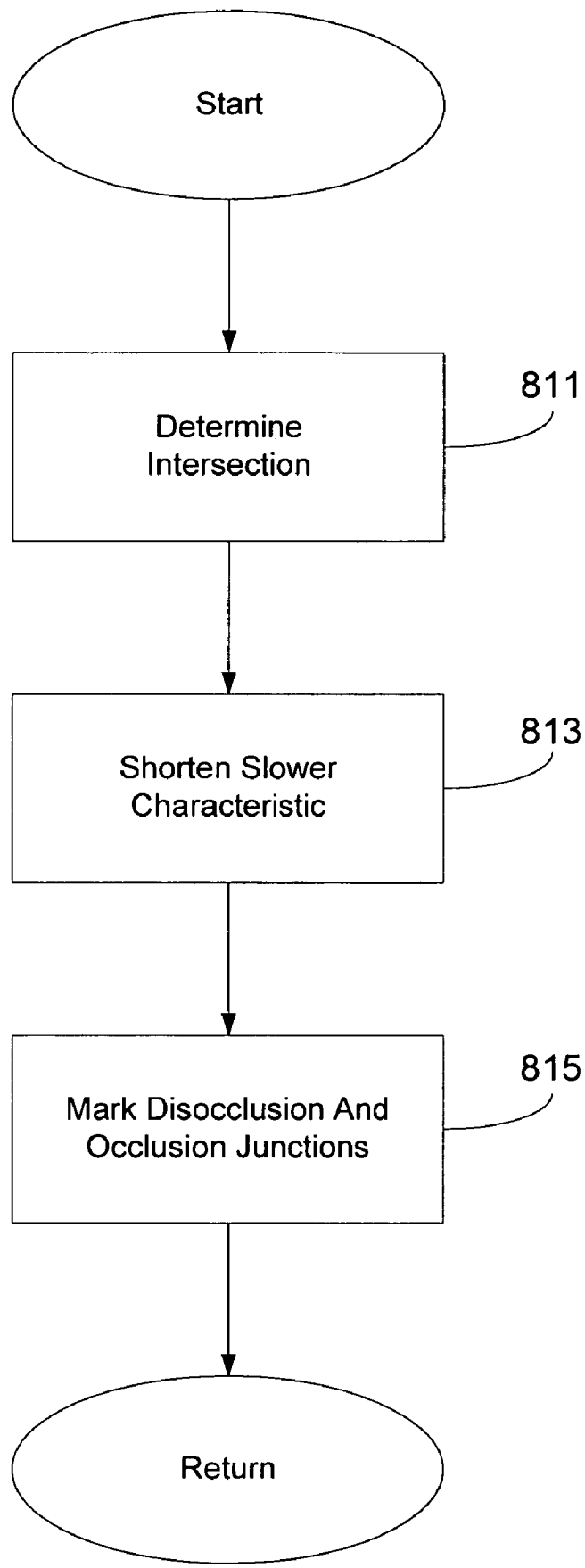
FIG. 8 is a flow diagram of a process for segment extension determination in accordance with aspects of the invention.

The extension of a segment is initially taken as the intersection of the line containing the segment with the EPI domain. The characteristics are ordered by increasing depth: faster characteristics, characteristics with a greater slope in the EPI, are first in the order and slower characteristics, characteristics with a lesser slope in the EPI, are later in the order. Junction detection and segment extension may be performed as follows:

For each characteristic C
  For each characteristic C' faster than C
    if the extension of C and C' don't intersect
    then do nothing
    else
      if the seed of C is before the intersection in time
      then mark the intersection as an occlusion junction
      else mark the intersection as a disocclusion junction
      shorten the extension to include the seed and end at occlusion and disocclusion junction
      return
    return
  return Aspects of this process are shown in the flow diagram of the process of FIG. 8 performed for each segment. In block 811 the process determines intersections of a segment with other segments. In block 813 the process shortens the slower characteristic to not extend past the intersection away from a seed of the segment. In block 815 the process marks disocclusion and occlusion junctions.

The result of this procedure is that extension segments of characteristics are maximal segments. They should not be extended since they are cut by extensions of faster characteristics.

The straight segment detection stage does not necessarily lead to a dense three-dimensional reconstruction. EPIs are often comprised of almost homogeneous regions bounded by straight segments; these straight segments correspond generally to trajectories of 3D points located in the boundaries of the 3D objects in the observed scene. In many embodiments interpolation between the detected straight segments in EPIs is performed to increase density of 3D reconstruction.

In some embodiments the interior of a polygon is merely assigned the slope of its slowest segment, or the slope of the segment that begins with a disocclusion and with an occlusion. In other embodiments the interior of a polygon is merely assigned the slope of its fastest segment. In many embodiments a linear interpolation is performed. The linear interpolation is often performed between slowest segments of the polygon earlier in time in the spatio-temporal volume and slowest segments of the polygon later in time in the spatio-temporal volume. In other embodiments different mapping functions between segments are used.

In some embodiments global optimization is performed for interpolation, with the global cost function that is eventually minimized is the sum of the local costs of matching pixels plus the sum of occlusion costs for unmatched pixels. The global optimization is efficiently performed in 1D along each epipolar line assuming monotonic ordering using dynamic programming. It has been shown that better reconstruction results can be obtained if the dynamic programming minimization is "guided" by extremely sure correspondences, previously established by another technique (for example by matching edgels, corners of image patches, etc.). For instance, one method first determines correspondences between edges using dynamic programming and then perform another stage of dynamic programming on the intensity values between consecutive pairs of corresponding edges in order to "fill in the gaps". Other methods modify the global cost function by assigning very low cost to these previously established correspondences, in order to constrain the dynamic programming solution.

Figure 9:
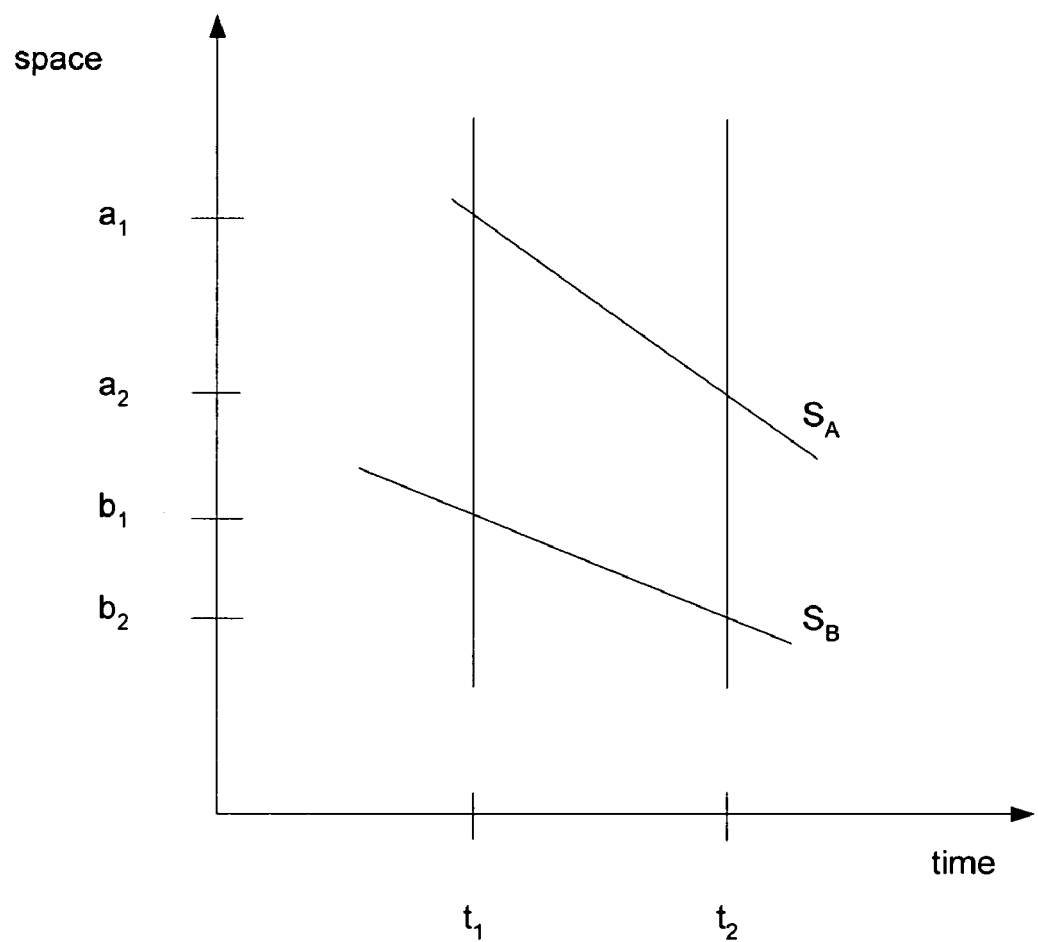
FIG. 9 shows a portion of an EPI for illustration of a process of interpolation in accordance with aspects of the invention.

As previously indicated, each EPI may be considered an x-t slice of a spatio-temporal volume, for a fixed $y=y_j$. An EPI, such as the EPI of FIG. 9, may include straight lines $L_1=\{(i, t_1), i=1, \ldots, n\}$ and $L_2=\{(i,t_2),i=1, \ldots, n\}$ corresponding to two fixed instants of time $t_1$ and $t_2$. The EPI may also include two straight segments $S_A$ and $S_B$, intersecting both $L_1$ and $L_2$. The segment $S_A$ and $S_B$ are preferably consecutive segments in that there are no segments between $S_A$ and $S_B$ in the range $t_1$ to $t_2$. Straight segment $S_A$ intersects $L_1$ at point $(a_1,t_1)$ and $L_2$ at $(a_2,t_2)$; straight segment $S_B$ intersects $L_1$ at point $(b_1,t_1)$ and $L_2$ at $(b_2,t_2)$. In many embodiments a process determines a set of correspondences between pixels in intervals [a1,b1] and [a2,b2], preferably with a uniqueness and ordering constraint. Preferably the process executes a classical dynamic programming algorithm to determine the correspondences. The process is performed for all successive segments intersecting lines $L_1$ and $L_2$, the depth of all 3D points observed at time $t_1$ and $t_2$ can be computed.

The sequences of pixels values in interval [a1,b1] and [a2,b2], may be denoted $(u_1, \ldots, u_m)$ and $(v_1, \ldots, v_n)$, respectively. m and n (the number of pixels in intervals [a1, b1] and [a1,b1]) are equal if the delimiting straight segments have the same slope, that is they correspond to points moving at same velocity.

In some embodiments a correspondence function f between indices is determined. This function should be non-decreasing, which indicates that characteristics do not cross. As a parameter the cost of occlusion, c, which should be a positive value is used. The local cost of matching $u_i$; to $v_j$ is therefore, for example, $|v_j-u_i|$. The cost of f can be written as the sum of the local costs for diagonal edges plus c times the number of horizontal and vertical edges. Among all possible functions the one with lowest cost is selected. As the cost function is additive and local (adding one edge to an already constructed path does only depend on the endpoint of this path), a dynamic programming algorithm can be executed to efficiently find the optimal path. The complexity is O(mn).

Figure 11:
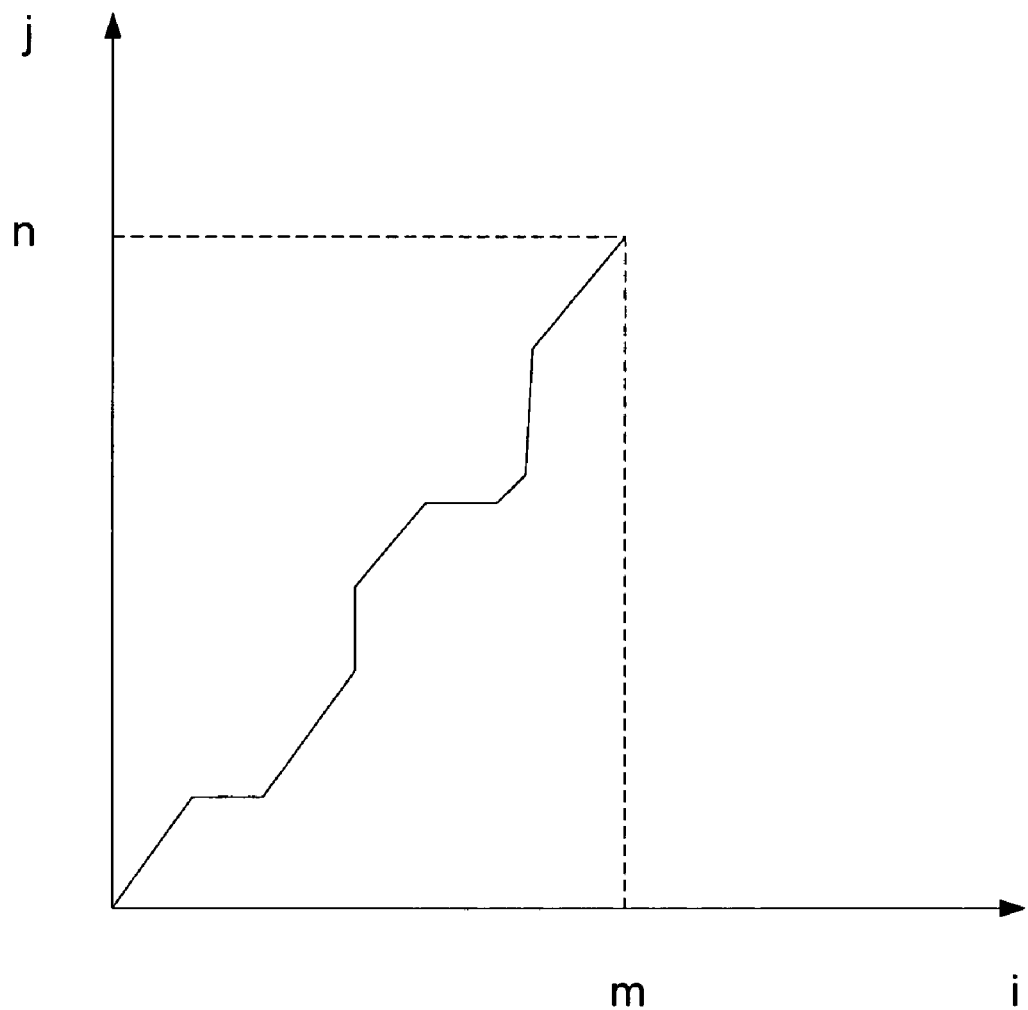
FIG. 11 is a graph showing a correspondence function used as part of interpolation in accordance with aspects of the invention.

A sample function f is represented in a diagram inside the rectangle of diagonal corners (0,0) and (m,n), as shown in FIG. 11. Each increment of f is either horizontal, vertical or diagonal. The function may be interpreted as follows: if f passes through the vertex (i,j) and the previous edge in f is diagonal, then f matches $u_i$ to $v_j$. If the previous edge is horizontal, point $u_i$ is occluded in frame $t_2$. If the previous edge is vertical, point $v_j$ is occluded in frame $t_1$.

Figure 10:
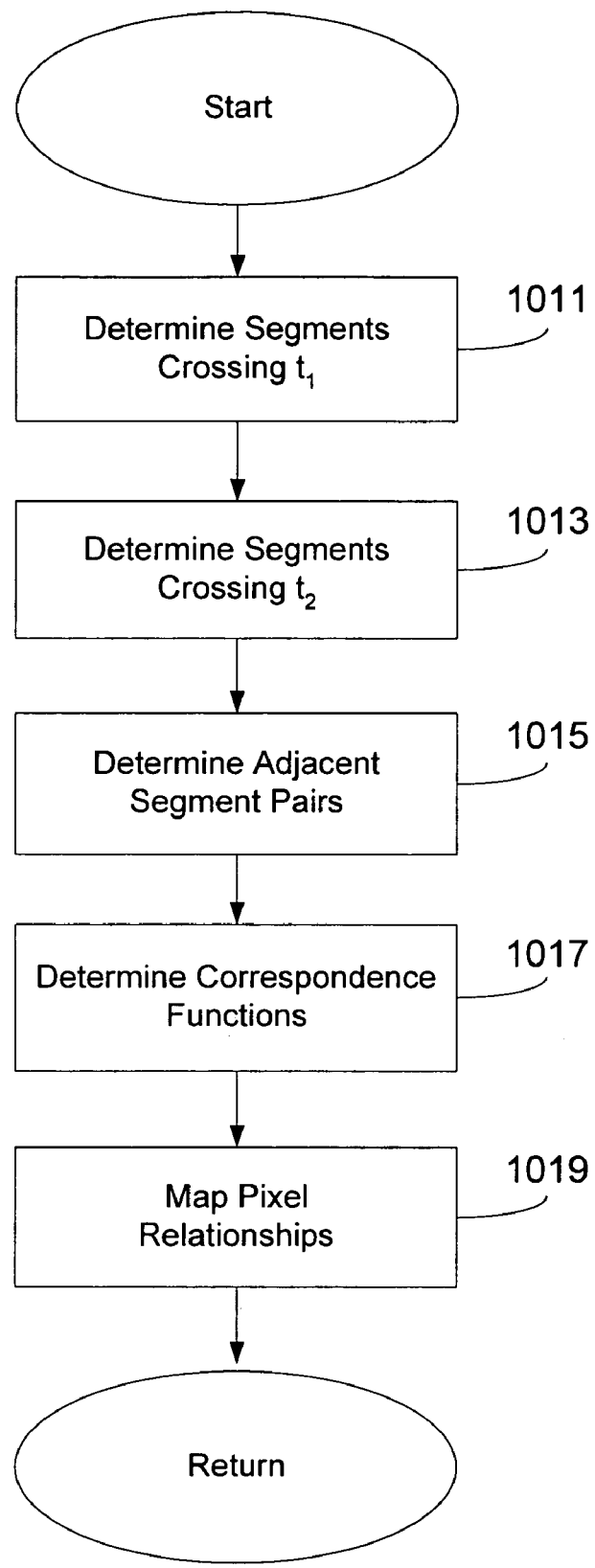
FIG. 10 is a flow diagram of a process for performing interpolation in accordance with aspects of the invention.

Thus, in some embodiments a process such as provided in the flow diagram of FIG. 10 is used to perform interpolation. In block 1011 the process determines segments crossing a time t1 in a spatio-temporal volume, such as an EPI. In block 1013 the process determines segments crossing a time t2. In some embodiments t1 and t2 comprise lines from adjacent frames in a series of frames taken over time. In block 1015 the process determines adjacent segment pairs. In block 1017 the process determines correspondence functions for each of the adjacent segment pairs, the correspondence functions for providing values for pixels between the adjacent segment pairs. In block 1019 the process maps pixel relationships using the correspondence functions.

Systems and methods for and related to three-dimensional estimation are provided. Although the invention has been described with respect to certain embodiments, it should be recognized that the invention includes the claims and their insubstantial variations supported by the disclosure.

What is claimed is:

1. A method of determining three dimensional information from two dimensional images of a scene, comprising:
   forming, by a computer, a spatio-temporal manifold from two dimensional images of a scene;
   determining, by the computer, digital straight segments of level lines of the spatio-temporal manifold;
   decomposing, by the computer, the spatio-temporal manifold into cells using the digital straight segments of level lines of the spatio-temporal manifold, including extending at least one of the digital straight segments of level lines to intersection with a segment of a level line having a greater slope than a slope of the extended at least one of the digital straight segments; and
   densifying, by the computer, the decomposed spatio-temporal manifold.

2. The method of claim 1 further comprising:
   forming, by the computer, a plurality of spatio-temporal manifolds from two dimensional images of the scene;
   determining, by the computer, characteristics of the plurality of the spatio-temporal manifolds;
   decomposing, by the computer, the plurality of spatio-temporal manifolds into corresponding cells using the characteristics of the plurality of spatio-temporal manifolds; and
   densifying, by the computer, each of the decomposed plurality of spatio-temporal manifolds.

3. The method of claim 2 further comprising determining, by the computer, a three dimensional position of points represented in the densified decomposed plurality of spatio-temporal manifolds.

4. The method of claim 1 wherein determining characteristics of the spatio-temporal manifold comprises:
   determining segments formed of level lines in the spatio-temporal manifold; and
   selecting segments with higher meaningfulness.

5. A method of determining three dimensional information from two dimensional images of a scene, comprising:
   forming, by a computer, a spatio-temporal manifold from two dimensional images of a scene;
   determining, by the computer, characteristics of the spatio-temporal manifold;
   decomposing, by the computer, the spatio-temporal manifold into cells using the characteristics of the spatio-temporal manifold; and
   densifying, by the computer, the decomposed spatio-temporal manifold;
   wherein determining characteristics of the spatio-temporal manifold comprises:
   determining segments formed of level lines in the spatio-temporal manifold, and selecting segments with higher meaningfulness; and
   wherein selecting segments with higher meaningfulness comprises:
   computing the meaningfulness of each segment,
   ordering the segments by meaningfulness, and
   for each segment, in order of meaningfulness, determining edgels of the segment that form a longest sub-segment of the segment excluding edgels of the segment that have already been determined as edgels of a segment of higher meaningfulness that form a longest sub-segment of the segment of higher meaningfulness.

6. A method of determining three dimensional information from two dimensional images of a scene, comprising:
   forming, by a computer, a spatio-temporal manifold from two dimensional images of a scene;
   determining, by the computer, characteristics of the spatio-temporal manifold;
   decomposing, by the computer, the spatio-temporal manifold into cells using the characteristics of the spatio-temporal manifold; and
   densifying, by the computer, the decomposed spatio-temporal manifold;
   wherein determining characteristics of the spatio-temporal manifold comprises:
   determining segments formed of level lines in the spatio-temporal manifold, and selecting segments with higher meaningfulness; and
   wherein each segment is formed of level lines having digital straight segments.

7. The method of claim 6 wherein the level lines of digital straight segments form chain codes.

8. The method of claim 7 wherein the digital straight segments include digital straight segments with gaps in the digital straight segments.

9. A method of determining three dimensional information from two dimensional images of a scene, comprising:
   forming, by a computer, a spatio-temporal manifold from two dimensional images of a scene;
   determining, by the computer, characteristics of the spatio-temporal manifold;
   decomposing, by the computer, the spatio-temporal manifold into cells using the characteristics of the spatio-temporal manifold; and
   densifying, by the computer, the decomposed spatio-temporal manifold;
   wherein determining characteristics of the spatio-temporal manifold comprises:
   determining segments formed of level lines in the spatio-temporal manifold, and selecting segments with higher meaningfulness; and
   wherein decomposing the spatio-temporal manifold into cells using the characteristics of the spatio-temporal manifold comprises:
   determining a continuous segment for each selected segment, each continuous segment including endpoints of the corresponding selected segment,
   determining intersections of the continuous segments, and modifying lengths of continuous segments that intersect with continuous segments having a greater slope.

10. The method of claim 9 wherein modifying lengths of continuous segments that intersect with continuous segments having a greater slope comprises shortening the lengths by removing portions of the continuous segments past the intersection from the corresponding selected segment.

11. The method of claim 1 wherein the spatio-temporal manifolds comprise epipolar plane images.

12. The method of claim 1 wherein densifying each of the decomposed plurality of spatio-temporal manifolds comprises interpolating within the cells.

13. The method of claim 1 wherein the cells form a polygonal mesh.

14. The method of claim 13 wherein densifying each of the decomposed plurality of spatio-temporal volumes comprises interpolating within polygons of the polygonal mesh.

15. A system for forming three dimensional information from two dimensional images of a scene, comprising:
a camera on a stage;
a motor for moving the camera;
a computer configured to provide commands to the motor and to provide commands to the camera, and to receive image information from the camera;
the computer being programmed to form a spatio-temporal volume from the image information, determine straight segments of level lines of the spatio-temporal volume, extend the straight segments to an intersection with a straight segment with a greater slope, decompose the spatio-temporal volume into cells using the extended straight segments of the spatio-temporal volume, and densify the decomposed spatio-temporal volume.

16. The system of claim 15 wherein the stage is a linear stage.

17. The system of claim 15 wherein the spatio-temporal volume is an epipolar plane image (EPI).

18. The system of claim 15 wherein the computer is further programmed to determine three dimensional information for points represented in the densified decomposed spatio-temporal volume.

19. The system of claim 15 wherein the computer is further programmed to select segments using meaningfulness of the segments.

20. A system comprising:
a camera;
means for translating the camera in a first direction; and
means for determining a spatio-temporal volume from images received from the camera, for determining meaningful straight segments of level lines of the spatio-temporal volume, for extending at least some of the straight segments until occlusion of the at least some of the straight segments, and for densifying the spatio-temporal volume.

* * * * *

UNITED STATES PATENT AND TRADEMARK OFFICE
CERTIFICATE OF CORRECTION

PATENT NO.        : 8,014,588 B2
APPLICATION NO.   : 11/594554
DATED             : September 6, 2011
INVENTOR(S)       : Rudin et al.

It is certified that error appears in the above-identified patent and that said Letters Patent is hereby corrected as shown below:

In column 10, line 49, delete "[a1,b1]" and insert --[a2,b2]--, therefor.

In column 10, line 56, delete "$u_i$; to $v_j$" and insert --$u_i$ to $v_j$--, therefor.

Signed and Sealed this
Twenty-fifth Day of December, 2012

David J. Kappos
*Director of the United States Patent and Trademark Office*